United States Patent
Thomsen

(10) Patent No.: US 10,975,629 B2
(45) Date of Patent: Apr. 13, 2021

(54) OFFSHORE INSTALLATION

(71) Applicant: National Oilwell Varco Denmark I/S, Brondby (DK)

(72) Inventor: Jens Rordam Thomsen, Copenhagen O (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 52 days.

(21) Appl. No.: 16/341,090

(22) PCT Filed: Oct. 11, 2017

(86) PCT No.: PCT/DK2017/050336
§ 371 (c)(1),
(2) Date: Apr. 11, 2019

(87) PCT Pub. No.: WO2018/072801
PCT Pub. Date: Apr. 26, 2018

(65) Prior Publication Data
US 2020/0190913 A1    Jun. 18, 2020

(30) Foreign Application Priority Data

Oct. 17, 2016 (DK) .......................... PA 2016 70817

(51) Int. Cl.
*E21B 17/01* (2006.01)

(52) U.S. Cl.
CPC ................... *E21B 17/017* (2013.01)

(58) Field of Classification Search
CPC .................................................. E21B 17/017
See application file for complete search history.

(56) References Cited

U.S. PATENT DOCUMENTS

| 4,509,877 A * | 4/1985 | Sobin ........................ D04C 1/06 24/115 N |
| 4,854,781 A | 8/1989 | Sparks et al. |
| 5,526,846 A * | 6/1996 | Maloberti ............. E21B 17/017 138/109 |
| 6,009,907 A | 1/2000 | Secher |

(Continued)

FOREIGN PATENT DOCUMENTS

| BR | 102013009433 A2 | 1/2015 |
| EP | 0296056 A1 | 12/1988 |

(Continued)

OTHER PUBLICATIONS

Extended European Search Report for 17 86 2183 dated Apr. 6, 2020.

(Continued)

*Primary Examiner* — Matthew R Buck
(74) *Attorney, Agent, or Firm* — Pearne & Gordon LLP

(57) ABSTRACT

An offshore installation comprising a riser pipe and a bend stiffener. The riser pipe comprises a flexible pipe body having a pipe length and an end fitting and the riser has a longitudinal pipe axis. The bend stiffener comprises a helically shaped body arranged to surround a stiffened length section of the flexible pipe body. The bend stiffener has a root end and a far end, wherein the root end is closer to the end fitting than the far end and the root end is locked at an axial distance to the end fitting, determined along the longitudinal pipe axis.

22 Claims, 12 Drawing Sheets

(56) References Cited

U.S. PATENT DOCUMENTS

| | | | |
|---|---|---|---|
| 6,105,620 | A | 8/2000 | Haberl |
| 6,220,303 | B1 * | 4/2001 | Secher ................ E21B 43/0135 |
| | | | 138/110 |
| 7,575,254 | B2 | 8/2009 | Cunha Xavier et al. |
| 7,963,299 | B2 | 6/2011 | Sheldrake |
| 9,012,001 | B2 | 4/2015 | Christensen et al. |
| 2009/0020061 | A1 | 1/2009 | Dybvik et al. |
| 2012/0304447 | A1 | 12/2012 | Smith et al. |
| 2013/0239867 | A1 | 9/2013 | Horton, III |
| 2014/0361531 | A1 * | 12/2014 | Siders .................... F16L 35/00 |
| | | | 285/114 |
| 2015/0020726 | A1 | 1/2015 | Mclemore et al. |
| 2016/0312544 | A1 | 10/2016 | Whitefield et al. |
| 2018/0097348 | A1 * | 4/2018 | Zurovec ................ G01V 1/3808 |

FOREIGN PATENT DOCUMENTS

| | | | |
|---|---|---|---|
| EP | 0565445 | B1 | 6/1995 |
| EP | 2 870 397 | A1 | 5/2015 |
| GB | 2248729 | A | 4/1992 |
| GB | 2291686 | A * | 1/1996 ........... E21B 17/017 |
| GB | 2291686 | B | 5/1998 |
| GB | 2463471 | A | 3/2010 |
| GB | 2492109 | A | 12/2012 |
| WO | 92/12376 | A1 | 7/1992 |
| WO | 2004/055319 | A1 | 7/2004 |
| WO | 2013036932 | A1 | 3/2013 |
| WO | 2013113316 | A1 | 8/2013 |
| WO | 2014/023311 | A1 | 2/2014 |
| WO | 2015/070908 | A1 | 5/2015 |
| WO | 2015189291 | A1 | 12/2015 |

OTHER PUBLICATIONS

Danish Search Report for Application No. PA 2016 70817, dated Apr. 27, 2017.
International Search Report for International Application No. PCT/DK2017/050336, dated Dec. 8, 2017.
"Recommended Practice for Flexible Pipe" ANSI/API 17B, fourth edition, Jul. 2008.
"Specification for Unbonded Flexible Pipe" ANSI/API 17J, third edition, Jul. 2008.
U.S. Pat. No. 289,381, entitled Hose Protector, issued Dec. 4, 1883.

* cited by examiner

OFFSHORE INSTALLATION

TECHNICAL FIELD

The present invention relates to an offshore installation comprising a pipe and a bend stiffener arranged for stiffening a length section of the pipe for protecting the pipe against local over bending. The pipe is advantageously a flexible pipe, such as an unbonded flexible pipe.

BACKGROUND ART

Bend stiffeners for use in combination with flexible pipes are well known in the art and are generally applied for locally supporting flexible pipes to limit bending stresses and curvature of the pipe to an acceptable level.

A bend stiffener has the function of stiffening a flexible pipe in a selected section of the flexible pipe. The bend stiffener is provided to prevent overbending on specific lengths along the flexible pipe, i.e. the bend stiffener has the purpose of restricting or reducing the risk of bending the flexible pipe beyond a maximal bending radius.

Flexible pipes and structures are for example used in the oil industry for raising or transporting hydrocarbons from a subsea well head to a platform or floating equipment such as a Floating Production and Storage Offloading boat known by the abbreviation FPSO. Such flexible pipes are for example described in "Recommended Practice for Flexible Pipe "API Recommended Practice 17 B", fourth edition 2008 published by the American Petroleum Industry. A bend stiffener is in particular useful in combination with an unbonded flexible pipe e.g. as described in "Specification for unbonded flexible pipe" API 17J, third edition 2008, also published by the American Petroleum Industry.

It should be observed that bend stiffeners, inclusive the bend stiffener of the assembly of the present invention can also be used with other types of flexible pipelines, particularly in the case of subsea oil extraction installations, such as multi-pipe flexible lines known as umbilicals or electrical cables.

A flexible pipe has at least two main benefits compared to stiff pipes, namely that it can be transported in long lengths on a reel and that it can move and adapt to quite substantial forces to which it may be subjected during use e.g. subsea use. However, even though the flexible pipe can be quite flexible as long as it is not bent beyond a certain bending radius, a bending beyond the minimum bending radius (MBR) for a given flexible pipe may potentially damage the pipe even to a degree of burst or collapse of the pipe. If the flexible pipe is intended for use in transporting hydrocarbons, e.g. well streams from oil wells, such damage of the flexible pipe may have catastrophic consequences and it is therefore important to ensure or minimize the risk of any potential overbending beyond the MBR of a given pipe.

Flexible pipes are often installed as either stationary pipes, i.e. the pipes are positioned as flow lines along a seabed, or as dynamic pipes, i.e. the pipes which are used are subjected to various forces and deformations and especially forces which may lead to substantial bends of the flexible pipe. A pipe installed to be a dynamic pipe is usually called "a riser" or a "riser pipe" such as a riser or a pipe connected to a floating unit (platform, vessel and other). For a pipe installed to be a stationary pipe e.g. a flow line, the risk of overbending is mainly present near connection(s) between the flexible pipe and other equipments, and often such risk of overbending stationary flexible pipes is relatively low depending on the whole structure in which the flexible pipe is connected. Risk of overbending flexible pipes for stationary use is mainly present during the installation of the flexible pipe.

For dynamic use the risk of overbending a flexible pipe is much higher and it is much more common to use bend stiffeners for avoiding overbending of such flexible pipes.

A bend stiffener may for example be fitted to the flexible pipe in the region where the flexible pipe has an end-fitting and or is connected to a relatively stiff member. The term "end fitting" is used herein as a generic term to comprise end-fittings which are fitted to the layer(s) of the flexible pipe at its two ends. The end fitting or fittings are usually considered as parts of the pipe forming the respective ends of the flexible pipe. The end-fitting is also referred to as a termination member or termination. The end fitting may advantageously be an end-connector used for connecting the flexible pipe to another element, such as another pipe, a subsea well head, a vessel or a platform.

A bend stiffener may also be mounted on a length section of the flexible pipe some distance from the end fittings, for example at the edge of an intermediate support, for example in the case of a flexible pipe being used as a riser with a "lazy S" or "Steep S" configuration, as described in API 17 B, or alternatively at the end of a rigid guide tube protecting the upper part of the flexible pipe, as depicted in FIGS. 11, 12 and 13 of WO 92/12376 or in EP-565,445.

A prior art bend stiffener may for example be in the form of a bend stiffener consisting of a single elastic body moulded in polyurethane and may alternatively comprise an internal reinforcing structure as described in U.S. Pat. No. 6,220,303.

A problem observed with the above type of bend stiffeners is that the temperature of the pipe section covered by the bend stiffener may increase to an undesired temperature due to the thermal insulation properties of the bend stiffener. This may lead to overheating of the outer layers of the pipe, leading to damaging of one or more layers of the pipe, in particular the outer sheath lying immediately below the bend stiffener.

In some prior art bend stiffeners this problem has been alleviated by incorporating heat-dissipation means, as is recommended in GB-A-2,291,686, U.S. Pat. No. 7,963,299 and in U.S. Pat. No. 6,009,907 where the elastic body or the underlying outer sheath of the pipe comprises passages for water to cool the outer sheath of the pipe.

WO15070908 discloses a bend stiffener comprising a plurality of beams arranged to be disposed around a tubular member. A support is provided for connecting the bend stiffener to the tubular member. A first rigid rod connects a first beam of the plurality of beams to a second beam of the plurality of beams. The first rigid rod is connected at a surface of the first beam such that it does not lie on the same axis as a second rigid rod connected at an opposite surface of the first beam. A stiffness of any of the plurality of beams and connectors between beams and rods provides bend stiffening to the tubular member and allows fluid such as seawater to pass between the bend stiffener and the tubular member.

DISCLOSURE OF INVENTION

The object of the present invention is to provide an alternative offshore installation comprising a pipe and a bend stiffener, wherein the bend stiffener is relatively simple to produce and mount onto the pipe to provide the assembly.

This object has been achieved by the present invention as defined in the claims.

The offshore installation of the invention and/or embodiments thereof has shown to have a large number of advantages which will be clear from the following.

The offshore installation comprises a riser pipe and a bend stiffener. The bend stiffener is arranged to resist undesired and excessive bending of the flexile pipe i.e. bending exceeding a design limit.

A flexible pipe is usually designed with a storage minimum bend radius (MBR) and an operating MBR. The abbreviation MBR is herein applied to mean the operating MBR for dynamic applications unless anything else is specified. The MBR requirement is for example as defined in "Specification for Unbonded Flexible Pipe", ANSI/API 17J, Third edition, July 2008.

The riser pipe comprises a flexible pipe body and an end fitting. Usually the riser pipe has an end fitting at each of its ends for being connected to another pipe or a subsea or sea surface installation. The riser pipe has a longitudinal pipe axis which is also referred to as the pipe axis. The pipe body has a pipe length, which is advantageously relatively long, such as at least about 50 m, such as at least about 100 m, such as from about 200 m to about 3000 m. Generally most riser pipes have a pipe length of from about 500 m to about 2000.

The bend stiffener comprises a helically shaped body arranged to surround a length section of the flexible pipe body. This length section surrounded by the helically shaped body of the bend stiffener is herein referred to as the stiffened length section.

The bend stiffener has a root end and a far end, wherein the root end is closer to the end fitting than the far end and the root end is locked in an axial distance to the end fitting, determined along the longitudinal pipe axis. Where the pipe has an end fitting at each of its ends, the end fitting referred to concerning the distance between the bend stiffener and the end fitting is the closest end fitting.

The installation of the invention has been found to be very simple to install and simultaneously provides a high protection against overbending and thereby damaging of the riser pipe. Further it has been found that the bend stiffener may be provided to have a relatively low weight which is beneficial both for reduced transporting cost and also for reduced load on installation e.g. reduced load to a sea surface installation to which the installation is connected or combined with.

Additionally it has been found that the installation also alleviates the above discussed problem concerning the temperature of the pipe section covered by the prior art bend stiffener may increase to an undesired temperature due to the thermal insulation properties of the bend stiffener. The bend stiffener of the installation may be shaped to significantly reduce the risk of overheating the outer layer or layers of the pipe. In preferred embodiments as further described below the risk of overheating may be reduced to a minimum or practically eliminated.

The riser pipe is a pipe that extends from one level to another vertically displaced level, usually displaced at least about 30 m, such as at least about 100 m, such as at least about 500 m.

The term "in radial direction" means a direction from the axis of the pipe and radially outwards.

The terms "inside" and "outside" a layer of the pipe are used to designate the relative distance to the axis of the pipe, such that inside a layer means the area encircled by the layer i.e. with a shorter axial distance than the layer and "outside a layer" means the area not encircled by the layer and not contained by the layer, i.e. with a shorter axial distance than the layer.

The term "inner side" of a layer is the side of the layer facing the axis of the pipe. The term "outer side" of a layer is the side of the layer facing away from the axis of the pipe.

The term "cross-wound layers" means that the layers comprise wound elongate elements that are wound in opposite direction relatively to the longitudinal axis of the pipe where the angle to the longitudinal axis can be equal or different from each other.

The terms "length" and "length section" are determined in relation to the axis of the item in question unless anything else is specified, thus the length of the pipe is determined along the axis of the pipe, the length of the bend stiffener is determined along the axis of the bend stiffener and the length of the helically shaped body of the bend stiffener is determined along the axis of the helically shaped body.

The term "substantially" should herein be taken to mean that ordinary product variances and tolerances are comprised within the scope of the term.

The term "about" is generally used to include what is within measurement uncertainties. The term "about" when used in ranges should herein be taken to mean that what is within measurement uncertainties is included in the range.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Throughout the description or claims, the singular encompasses the plural unless otherwise specified or required by the context.

All diameters are cross sectional diameters unless otherwise specified.

The term "axial distance" is used herein to mean the perpendicular distance to the axis of the pipe when the pipe is substantially straight.

The term "unbonded" means in this text that at least two of the layers including the armouring layers and polymer layers are not bonded to each other. In practice the known pipe normally comprises at least two armouring layers located outside the inner sealing sheath. These armouring layers are not bonded to each other directly or indirectly via other layers along the pipe. Thereby the pipe becomes bendable and sufficiently flexible to roll up for transportation. Advantageously the unbonded pipe comprises separate unbonded polymeric and metallic layers, which allow relative movement between layers.

A catenary riser pipe should herein be interpreted to mean a transportation line comprising at least one catenary curved section i.e. at least one free hanging curved section where the curve is due to gravity and/or buoyancy module(s)—e.g. simple gravity induced catenary, lazy wave or steep wave configurations.

The term "seabed" is generally used to denote the subsea floor.

The term "water line" means the water line at still water. Unless specifically mentioned all distances and determinations in relating to the water line are made at still water at average water level.

The term "horizontal" means in a plane substantially parallel to the water line.

The term above means in a plane vertically above, where vertical direction is perpendicular to horizontal plan. In the same way the terms upper, uppermost as well as below, lower and lowermost means with respect to vertical planes i.e. in higher respectively lower planes.

The term "downwards" means in a direction towards a lower plane.

All features of the inventions including ranges and preferred ranges can be combined in various ways within the scope of the invention, unless there are specific reasons not to combine such features.

Advantageously the riser pipe is a flexible riser pipe. The riser pipe is preferably arranged between a subsea installation, such as a seabed installation e.g. a well head or another subsea pipe, and a sea surface installation such as an installation above the sea surface or below the sea surface but preferably closer to the sea surface than the subsea installation e.g. a platform or a vessel.

The riser is advantageously a flexible pipe connecting a sea surface installation (platform/buoy/vessel/floating unit) to a subsea installation (flowline/seafloor installation). The riser pipe may extend fully or partly between the surface installation and subsea installation. For example two or more riser pipes may be connected to extend between the surface installation and subsea installation.

In an embodiment the riser pipe comprises an assembly of a pipe body and end fittings where the pipe body comprises a composite of layered materials that forms a pressure-containing conduit. Preferably the riser pipe is a spoolable pipe. More preferably the pipe is a layered pipe comprising two or more bonded or unbonded layers or combinations thereof. Even more preferably the pipe comprises at least one armor layer, such as a metal armor layer and/or a fiber reinforced composite armor layer.

Advantageously the pipe is an unbonded flexible pipe as described in the standard "Recommended Practice for Flexible Pipe", ANSI/API 17 B, fourth Edition, July 2008, and the standard "Specification for Unbonded Flexible Pipe", ANSI/API 17J, Third edition, July 2008.

The pipe structure preferably allows relatively large deflections without any undesired or damaging increase in bending stresses.

The risk of overbending is in particular potential in areas where the flexible pipe is connected to a stiff or relatively stiff installation which restricts its movement. Thus, advantageously the stiffened length section of the flexible pipe body is in the vicinity of a subsea installation or in the vicinity of a surface installation to which the riser is connected. In an embodiment the stiffened length section of the flexible pipe body is within a distance of up to 50 m from the connection between the riser and the surface installation, such as within a distance of up to 40 m, such as within a distance of up to 30 m, within a distance of up to 20 m from the connection between the riser and the surface installation. In an embodiment the stiffened length section of the flexible pipe body is within a distance of up to 50 m from the connection between the riser and subsea installation, such as within a distance of up to 40 m, such as within a distance of up to 30 m, within a distance of up to 20 m from the connection between the riser and subsea installation.

For some installations where the riser pipe is connected to another unit in a connection which is not at seabed or sea surface but intermediate to these, there may also be a risk of overbending because the connection in itself may be relatively stiff and also the connecting partner may be stiff relative to the riser pipe. In an embodiment the stiffened length section of the flexible pipe body is in the vicinity of an intermediate riser connection, such as a connection where the end fitting of the riser pipe is connected to a second riser pipe or a midwater unit, such as a midwater arch or a midwater buoyancy module. The secondary riser pipe may be equal or different from the riser pipe. Advantageously the stiffened length section of the flexible pipe body is within a distance of up to 50 m from the intermediate riser connection, such as within a distance of up to 40 m, such as within a distance of up to 30 m, such as within a distance of up to 20 m from the intermediate riser connection.

The phrase "root end is locked in an axial distance to the end fitting, determined along the longitudinal pipe axis" means that the distance or length along the pipe axis between the root end of the bend stiffener and the end fitting is fixed.

In an embodiment the root end of the bend stiffener is mechanically locked to the end fitting, e.g. by being geometrically locked or by being secured directly or via another element to the end fitting.

In an embodiment the root end of the bend stiffener is mechanically locked to the end fitting directly. The bend stiffener may e.g. be welded to the end fitting or be mechanically secured by bolts. As described below the bend stiffener may comprise a collar for the connection.

In an embodiment the root end of the bend stiffener is mechanically locked to the end fitting indirectly via a support structure. The support structure may in principle be any kind of support structure which is capable of mechanically holding the root end of the bend stiffener and the end fitting locked at the selected axial distance. The axial distance is determined along the axis of the pipe. The support structure may e.g. comprise a part of or all of a subsea installation or a surface installation, such as a riser hang-off for supporting the riser pipe at the connection to a vessel and/or a platform, a vessel, a tube and/or a subsea anchoring structure.

In an embodiment the installation comprises the support structure.

In an embodiment the root end of the bend stiffener is supported by and/or attached to the support structure. For some applications it may be sufficient that the root end of the bend stiffener is supported by the structure e.g. by gravity. Preferably the root end of the bend stiffener is attached to the support structure e.g. by bolt(s) and/or by gripping jaws. Thereby a very safe locking may be obtained.

Preferably the end fitting is locked in a position relative to the support structure. In an embodiment the end fitting is mechanically supported by resting on the support structure. The end fitting may e.g. be held above the water line and supported by the support structure.

Advantageously—for a very safe locking—the end fitting is secured to the support structure e.g. by bolt(s) and/or by gripping jaws.

The support structure advantageously comprises a rigid structure preferably arranged to lock the end fitting and the root end of the bend stiffener in a position relative to each other. The support structure may advantageously comprise a first locking arrangement and a second locking arrangement. The first locking arrangement advantageously holds the end fitting and the second locking arrangement holds the root end of the bend stiffener. The end fitting and the root end of the bend stiffener may be held by being connected to or supported by the structure.

The locking arrangement(s) may be or comprise flanges, gripping jaws, collars projecting rim(s) etc.

In an embodiment the support structure comprises a tube. The tube may advantageously be arranged to surround the riser pipe at or immediately adjacent to the connection between the end fitting and the pipe body. The tube may advantageously be rigid. In an embodiment the tube is an I-tube or a J-tube. The tube is preferably arranged to lock the end fitting and the root end of the bend stiffener. Advantageously the tube comprises a/the first locking arrangement and a/the second locking arrangement, wherein the first locking arrangement and the second locking arrangement may be as described above.

In an embodiment the support structure comprises a pair of tube sections arranged to surround the pipe at distance along the pipe length to each other and preferably arranged to lock the end fitting and the root end of the bend stiffener. The pair of tube sections preferably comprises a first tube section with a/the first locking arrangement and a second tube section with a/the second locking arrangement, wherein the first locking arrangement and the second locking arrangement may be as described above.

The pair of tube sections may in an embodiment be interconnected e.g. by one or more rigid rods defining the distance between the tube sections.

The skilled person will understand that the root end of the bend stiffener may be connected to the tube or tube section in many ways.

In an embodiment the bend stiffener is extending partly into the tube or second tube section and and is attached to the tube or second tube section and/or directly to the pipe. If attached to the pipe, it is desired that the bend stiffener is attached to the flexible pipe at a distance from the end fitting (e.g. as disclosed in U.S. Pat. No. 7,575,254 and/or WO 04/055319.

The attachment may e.g. be by welding, by gluing, by geometrical locking and/or by one or more fasteners such as clamps, screws, bolts, rivets and etc.

In an embodiment the tube or the second tube section has a bell mouth shape (gradually expanding diameter). This embodiment is desired where the bend may have angular movements relative to the tube or the second tube section to further reduce the risk of overbending. The tube or the second tube section may have a bell mouth shape in its whole length, however, generally it is desired that the bell mouth shape is in up to about 25%, such as up to about 10% of the tube or the second tube section.

Advantageously the bell mouth shape comprises a tapered expanding opening away from the first locking arrangement.

In an embodiment the pipe extends through the tube or the pair of tube sections and the end fitting is mechanically supported by the first locking arrangement by resting on a collar of the tube or first tube section and/or the end fitting is attached to the first locking arrangement. The end fitting may e.g. be attached (secured) by bolt(s), jaws etc. The first locking arrangement may advantageously comprise a collar to which the end fitting is attached.

The collar may optionally comprise one or more projecting rims and or flange(s) for fastening.

In an embodiment the bend stiffener is rotarily movable with respect to the support structure. The rotary movability may e.g. be provided as described in U.S. Pat. No. 7,575,254.

In an embodiment the bend stiffener is angularly movable with respect to the support structure. The angular movability may e.g. be provided as described in US 2009/0020061.

In an embodiment the bend stiffener is stiffly attached to the support structure, e.g. by a weldment, by bolts, by jaws, by a retaining ring or similar securing means.

Advantageously the bend stiffener root end comprises a collar and the collar is attached to the pipe (preferably the end fitting) and/or the support structure for locking the bend stiffener root end at an axial distance (determined along the axis of the pipe) to the end fitting.

The collar may optionally comprise one or more projecting rims and or flange(s) for fastening e.g. via a retaining ring locked with a pin or bolt.

In a preferred embodiment the collar of the root end of the bend stiffener is locked at a distance along the length (and thereby along the axis) of the pipe from the end fitting: The collar preferably comprises a trumpet extending towards the end-fitting, the trumpet advantageously comprises a low friction material facing towards or contacting the pipe. Such trumpet—sometimes called a flare—is for example described in U.S. Pat. No. 7,575,254 and has the purpose of reducing wear on the outer side of the outer sheath (generally the outermost sheath of the pipe).

Generally it is desired that the stiffened length section of the flexible pipe body is surrounded by at least one helical winding and preferably a plurality of helical windings, such as up to 30 windings, such as from 3 to 25 windings, such as from 5 to 20 windings.

The number of windings is advantageously selected for the specific installation and also taking the environmental condition in consideration. The waves and water turbulence may vary much from site to site, and at some sites many windings will be preferred whereas at other sites fewer windings may be adequate.

In an embodiment the stiffened length section of the flexible pipe body has a length of up to about 10% of the pipe length, such as up to about 1% of the pipe length such as up to about 0.1% of the pipe length, preferably the stiffened length section of the flexible pipe body has a length of up to about 15 m, such as up to about 10 m, such as from about 1 m to about 15 m.

The desired stiffened length section may depend on the outer diameter of the pipe.

The pipe advantageously comprises an outer sheath with an outer sheath outer diameter. The outer sheath may be liquid impervious or it may be liquid pervious and mainly serves to protect underlying layer(s) of the pipe mechanically. As described above, the pipe preferably comprises a plurality of layers surrounded by the outer sheath. The plurality of layers preferably comprises an internal pressure sheath arranged to ensure internal fluid integrity and at least one armor layer between the outer sheath and the internal pressure sheath.

The outer sheath is adapted for mechanical and/or chemical protection of the pipe or one or more layers thereof. In an embodiment the outer sheath is liquid impervious to ensure fluid integrity, in particular to protect against ingress of water (sea water) when the pipe is in use.

The helically shaped body of the bend stiffener has an inner diameter determined perpendicularly to its center axis. In an embodiment the inner diameter of the helically shaped body is at least as large as an outer diameter of an outermost armor layer, preferably the inner diameter of the helically shaped body is at least as large as the outer diameter of the pipe.

The helically shaped body of the bend stiffener may be partly depressed into the outer sheath, but generally it is desired that the helically shaped body of the bend stiffener does not depress into the armor layer.

In an embodiment at least a length section L1 of the helically shaped body is arranged to rest against the outer sheath of the pipe, preferably at least a length section L1 of the a helically shaped body has an inner diameter corresponding to the outer diameter of the outer sheath outer diameter/the outer pipe diameter. The term "rest against" means that the helically shaped body of the bend stiffener does not apply axial forces to the pipe when the pipe is in unloaded and straight condition.

In an embodiment helically shaped body of the bend stiffener has an inner diameter which is essentially constant along its length. Thereby the bend stiffener is relatively simple to construct and produce.

In an embodiment helically shaped body of the bend stiffener has an inner diameter which varies along its length. Thereby the bend stiffener may be designed to stiffen the stiffened pipe section in a desired way e.g. to apply radial forces to the pipe which vary in a desired way along the length of the pipe or to ensure that the forces will be distributed in a desired way. In an embodiment the bend stiffener inner diameter corresponds to the outer pipe diameter along a length section L1, the length section is preferably at least half of the length of the helically shaped body.

In an embodiment inner diameter of the bend stiffener helically shaped body corresponds to the outer pipe diameter along at least about 75% of the whole length of the bend stiffener, such as at least along 3 m, such as at least along 5 m, such as at least along 10 m.

In an embodiment the bend stiffener helically shaped body has an inner diameter in at least a length section L2 thereof which is larger than the outer pipe diameter to provide a gap between the bend stiffener helically shaped body length section L2 and the pipe. The gap between the bend stiffener helically shaped body length section L2 and the pipe has a length along the bend stiffener which for example may be up to about 5 m, such as up to about 3 m and preferably is at a length section comprising the far end of the bend stiffener.

The gap may be constant or increase towards the far end to thereby provide the above described desired varying stiffening of the stiffened pipe section.

Advantageously the stiffened length section of the flexible pipe body has a length of up to about 30 times the outer diameter of the outer sheath, such as from about 3 times to about 20 times the outer diameter of the outer sheath.

In a preferred embodiment the helically shaped body comprises a helical string of solid material wound to surround the pipe. The helically shaped body is preferably helix shaped in at least a part of its length, preferably in the whole length of the helically shaped body.

Advantageously the helical string comprises at least two full windings surrounding the pipe. Preferably the helical string comprises up to 5 windings per m of the bend stiffener length. Preferably the helical string windings have a pitch of from about 15 cm to about 2 m, such as from about 0.2 times the outer pipe diameter to about 10 times the outer pipe diameter, such as from about 0.5 times the outer diameter of the outer sheath to about 5 times the outer diameter of the outer sheath.

The pitch may be constant or it may vary along the length of the helically shaped body of the bend stiffener. In an embodiment the pitch is substantially constant in a first length section nearest to the root end of the bend stiffener and in a section further from the root end of the bend stiffener the pitch is gradually increasing with increasing distance to the root end of the bend stiffener.

Advantageously the helical string comprises up to 30 windings, such as from 3 to 25 windings, such as from 5 to 20 windings.

The helical string windings may advantageously have an angle (or angles) to the bend stiffener axis of from about 30° to about 65°, such as from about 40° to about 55°.

The bend stiffener axis and the riser pipe axis may advantageously be coinciding when the riser pipe is in an non-bent and unloaded condition.

The helical string may in principle be of any type of material and combinations of material having a sufficient stiffness and strength. Generally the material(s) of the bend stiffener should preferably also be selected to have a desired chemical resistance against sea water. Thus, some materials may beneficially be provided with a coating of a material with a chemical resistance to withstand the influence of sea water and other aggressive components to which the bend stiffener may be subjected.

The helical string may for example comprise polymer and/or metal, such as steal or titanium, optionally the helical string comprises polymer coated metal.

In a preferred embodiment the helical string comprises fiber reinforced polymer. The fibers may advantageously be selected from natural fibers and/or synthetic fibers. Preferred fibers include carbon fibres, glass fibres, aramid fibres, steel fibres, polyethylene fibres, mineral fibres and mixtures comprising at least one of the foregoing.

The fibers may in principle be provided in any form, for example the fibers may comprise cut fibers, filaments, strands, yarn, rovings and any combinations comprising one of the forgoing.

The fibers may be woven or non-woven or partly woven. For simpler production and for high and controllable strength it is desired that the fibers comprises woven fibers.

The term "cut fibers" means herein fibers of non-continuous length, e.g. in the form of chopped fibers or melt blown fibers. The cut fibers are usually relatively short fibers e.g. less than about 5 cm, such as from about 1 mm to about 3 cm in length. The cut fibers may have equal or different lengths.

Filaments are continuous single fibers (also called monofilament).

The phrase "continuous" as used herein in connection with fibers, filaments, strands, or rovings, means that the fibers, filaments, strands, yarns, or rovings means that they generally have a significant length but should not be understood to mean that the length is perpetual or infinite. Continuous fibers, such as continuous filaments, strands, yarns, or rovings preferably have a length of at least about 10 m, preferably at least about 100 m, more preferably at least about 1000 m.

The term "strand" is used to designate an untwisted bundle of filaments.

The term "yarn" is used to designate a twisted bundle of filaments and/or cut fibers. Yarn includes threads and ropes. The yarn may be a primary yarn made directly from filaments and/or cut fibers or a secondary yarn made from yarns and/or cords. Secondary yarns are also referred to as cords.

The term "roving" is used to designate an untwisted bundle of strands or yarns.

Advantageously the reinforced polymer string comprises fibers in a polymer matrix, the polymer matrix is preferably a cured (thermoset) polymer to provide a rigid string with a desired stiffness.

The thermoset polymer is advantageously obtained from curing an impregnation substance comprising a thermosetting resin precursor, preferably selected from epoxy resins, vinylepoxyester resins polyester resins, polyimide resins, bis-maleimide resins, cyanate ester resins, vinyl resins, benzoxazine resins, benzocyclobutene resins, or mixtures comprising at least one of the foregoing thermosetting resin precursors.

The polymer matrix preferably comprises a cured thermosetting resin precursor, preferably selected from epoxy resins, vinylepoxyester resins polyester resins, polyimide resins, bis-maleimide resins, cyanate ester resins, vinyl resins, benzoxazine resins, benzocyclobutene resins, or mixtures comprising at least one of the foregoing thermosetting resin precursors.

Advantageously the polymer matrix is or comprises a cured epoxy polymer.

The helically shaped body of the bend stiffener may advantageously be produced from prepreg e.g. with a fiber to polymer matrix volume percent of more than about 30%, such as more than about 40% or even more than about 45%.

Prepreg is pre-impregnated fiber where the fibers are pre-impregnated with a resin which is partly cured.

The helical string may in principle have any cross-sectional shape, however, generally it is desired that the helical string has a cross-sectional shape which is selected from square, round, oval or semi round with a flat face towards the pipe. Thereby the string is relatively simple to produce and it may be provided to result in relatively little wear of the outer face of the pipe.

In a preferred embodiment the helical string in at least a part of its length is hollow. Thereby the bend stiffener may be provided with a very low weight which as described above may be very beneficial.

The helically shaped body of the bend stiffener may e.g. be produced by filling a fiber woven stocking with a support material, such as sand or foam, applying a stocking shaped polymer bag which is slightly larger than the filled fiber woven stocking to surround the fiber woven stocking and infusing an impregnation substance, e.g. a partly cured polymer or a resin into the gap provided between the fiber woven stocking and the stocking shaped polymer bag. If desired, additional fibers may be infused together with the impregnation substance. Thereafter the helically shaped body of the bend stiffener is shaped and cured. If desired, the filling material may be removed to provide the hollow string or string length section as described above. Alternatively the filling material may remain.

Thus, in an embodiment the helical string in at least a part of its length comprises a core of non-reinforcing material selected from foam and flowable particulate material, such as sand.

Generally it is desired that the helical string has a maximal cross-sectional outer dimension which is up to about 15 cm, such as up to about 10 cm, such as up to about 5 cm, the maximal cross-sectional outer dimension preferably decreases from the root end to the far end of the bend stiffener.

In an embodiment the helically shaped body comprises two or more helical strings of solid material wound to surround the pipe. The two or more helical strings are preferably wound in the same directions. Advantageously the helical strings form a double or triple helix. In an embodiment the helical strings are substantially identical. In an embodiment the helical strings differ from each other e.g. with respect to length and/or stiffness.

Advantageously the helically shaped body has a bend stiffness (flexural rigidity) which is larger than the bend stiffness of the pipe surrounded by the helically shaped body.

In an embodiment the helically shaped body has a bend stiffness (flexural rigidity) which is substantially constant along its length.

In an embodiment the helically shaped body has a bend stiffness (flexural rigidity) which differs along its length, preferably the bend stiffness of the helically shaped body decreases with increasing distance to the root end of the bend stiffener. Thereby the major stiffening effect is provided close to the root end of the bend stiffener and thus close to the end fitting where the pipe is connected to a rigid or less flexible body such as a subsea installation or a surface installation.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings.

The figures are schematic and may be simplified for clarity. Throughout, the same reference numerals are used for identical or corresponding parts.

Figure 1:
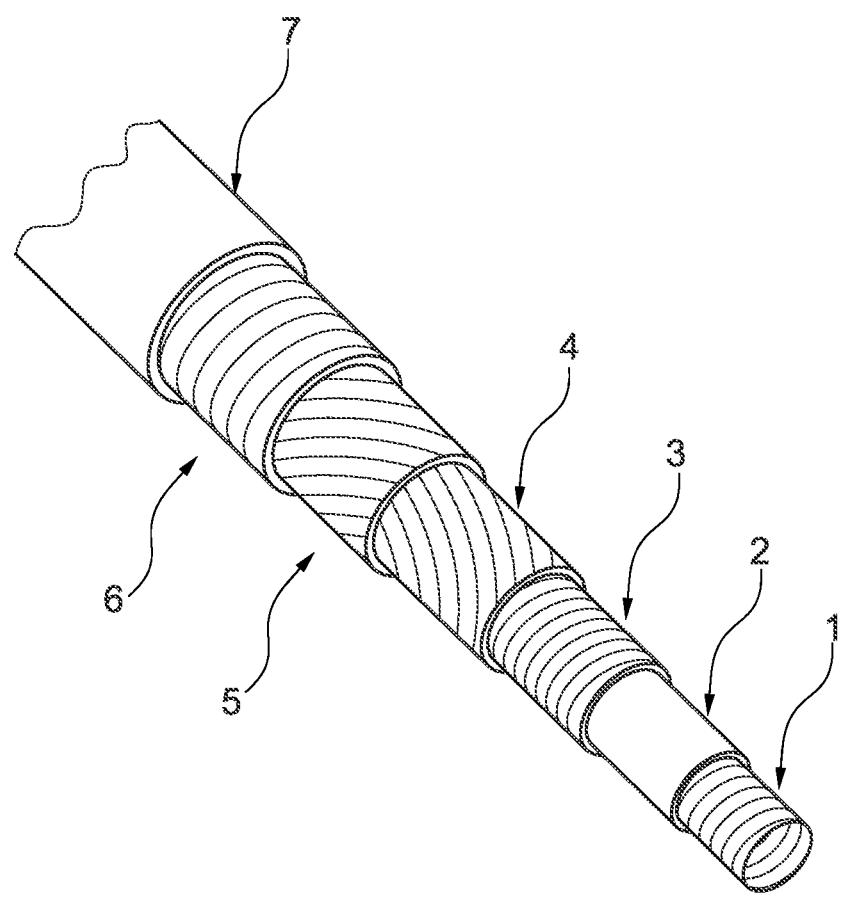
FIG. 1 is a schematic illustration of an unbonded pipe.

The carcass 1 is usually formed from helically wound profiles and/or folded tapes where the windings are usually interlocked with adjacent windings. The carcass is usually of metal. The carcass provides the pipe with collapse resistance.

The pressure sheath 2 provides the pipe with internal fluid integrity and defines the bore of the pipe in which the fluid can be transported. The pressure sheath usually comprises an extruded liquid impervious polymer layer.

The pressure armor layer 4 may in some pipes be omitted, however, for most pressure pipes it is desired to have at least one pressure armor layer. Such pressure armor layer usually comprises helically wound and optionally interlocked profiles and/or folded tapes which are usually of metal. The pressure armor layer 4 supports the internal pressure sheath and system internal-pressure loads in the radial direction.

The tensile armor layers 4, 5 are usually made from helically wound tapes of metal and/or fiber reinforced polymers (composite). The pipe may have more than two layers but usually an even number of layers are preferred to obtain a torsionally balanced pipe in particular where the pipe does not have a pressure armor. The tensile armor layers mainly have the purpose of resisting tensile loads.

The holding layer 6 has the purpose of holding the tensile armor layers 4, 5 in its position to resist buckling of the tensile armor layers 4, 5.

The outer sheath may usually be an extruded polymer sheath that provides external fluid integrity. However, as mentioned above the outer sheath may in some embodiments be liquid impervious and mainly serves to provide mechanical protection.

The various layers are advantageously not bonded along the length of the pipe body, but are connected via the not shown end-fitting, where the various layers are usually terminated.

The pipe of the installation of the invention may have further or fewer layers such that it is generally known from riser pipes. Further information of preferred riser pipes may be found in the standard "Recommended Practice for Flexible Pipe", ANSI/API 17 B, fourth Edition, July 2008, and the standard "Specification for Unbonded Flexible Pipe", ANSI/API 17J, Third edition, July 2008.

Figure 2:
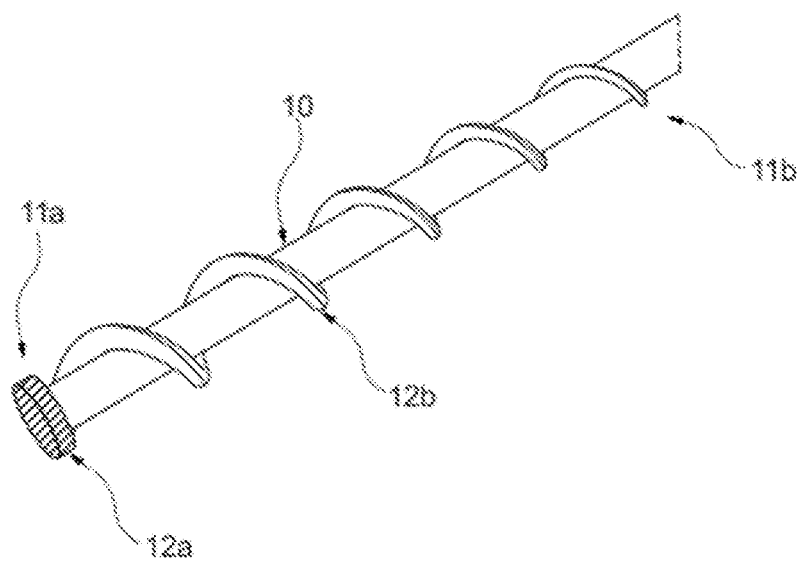
FIG. 2 is a perspective view of a bend stiffener and a riser pipe of an embodiment of an installation of the invention.

FIG. 2 shows a stiffened length section of a flexible pipe body 10 and a bend stiffener 12a, 12b comprising a root end Ila and a far end 11b. At the root end 11a the bend stiffener comprises a collar 12a and the bend stiffener comprises a helically shaped body 12 arranged to surround the stiffened length section of the flexible pipe body 10. The helically shaped body 12 comprises a string of solid material wound, preferably as described above. The helical string 12 has a maximal cross-sectional outer dimension which decreases from the root end 11a to the far end 11b of the bend stiffener.

Figure 3:
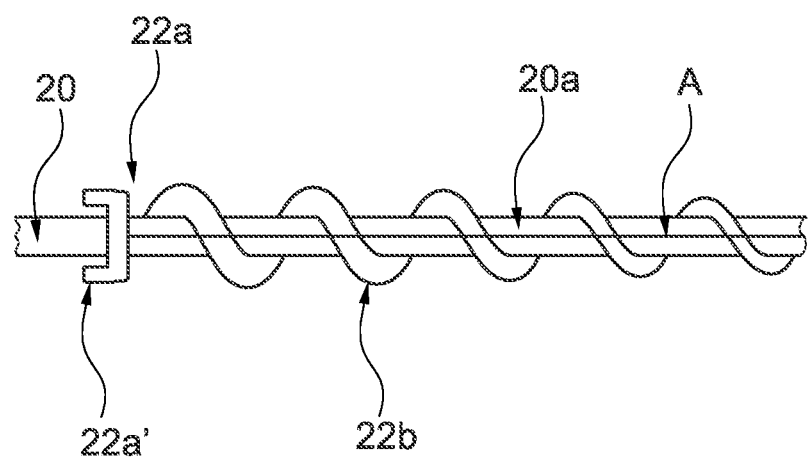
FIG. 3 is a side view of a bend stiffener and a riser pipe of an embodiment of an installation of the invention.

FIG. 3 shows a part of an installation of an embodiment of the invention comprising a pipe body 20 with a stiffened length section 20a. The pipe 20 has an axis as illustrated with ref "A". The bend stiffener comprises a helically shaped body 22b arranged to surround the stiffened length section 20a of the flexible pipe body 20. At its root end the bend stiffener comprises a collar 22a comprising flanges 22a' for being mounted to a rigid structure.

Figure 4:
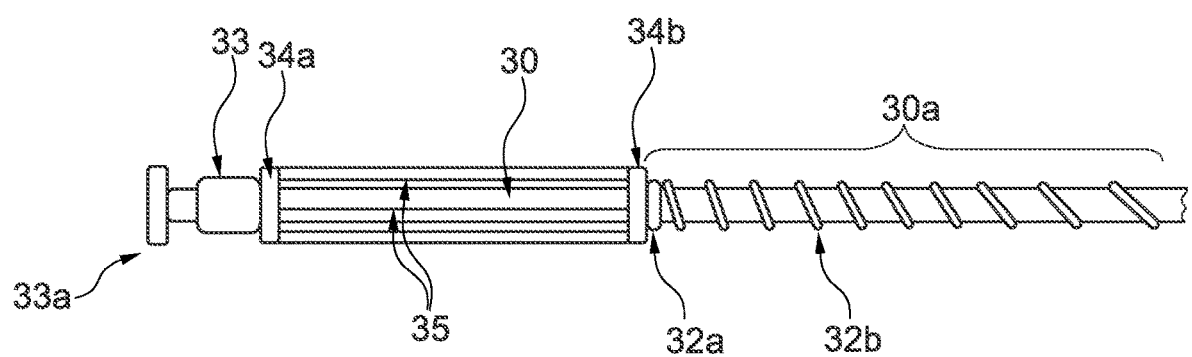
FIG. 4 is a side view of an embodiment of an installation of the invention.

FIG. 4 shows an embodiment of an installation of the invention. The installation comprises a riser pipe with a flexible pipe body 30 and an end fitting 33. A stiffened length section 30a of the pipe body 30 is surrounded by a helically shaped body 32b of a bend stiffener. At the root end of the bend stiffener it comprises a collar 32a. The collar 32a at the root end of the bend stiffener is mechanically locked to the end fitting 33 indirectly via a support structure. The support structure comprises a pair of tube sections 34a, 34b rigidly interconnected by a number of rigid rods 35. The tube sections 34a, 34b are arranged to surround the pipe body 30 and the first tube section 34a is secured to the end fitting 33 by a first locking arrangement and the second tube section 34b is secured to the collar 32a at the root end of the bend stiffener by a second locking arrangement. The end fitting 33 comprises a flange 33a for being mounted to a subsea installation, a surface installation or an intermediate unit.

Due to the rigid rods 35 the pipe below can be cooled down by water and/or air and accordingly the risk of overheating is highly reduced or even fully eliminated.

Figure 5:
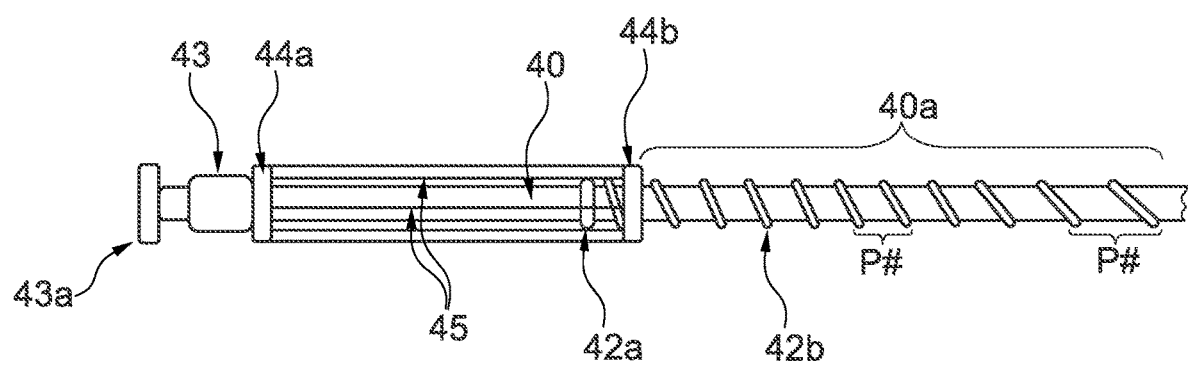
FIG. 5 is a side view of another embodiment of an installation of the invention.

FIG. 5 shows an embodiment of an installation of the invention which is a variation of the embodiment shown in FIG. 4. The installation comprises a riser pipe with a flexible pipe body 40 and an end fitting 43. A stiffened length section 40a of the pipe body 40 is surrounded by a helically shaped body 42b of a bend stiffener. At the root end of the bend stiffener it comprises a collar 42a. The collar 42a at the root end of the bend stiffener is mechanically locked to the end fitting 43 indirectly via a support structure. The support structure comprises a pair of tube sections 44a, 44b rigidly interconnected by a number of rigid rods 45. The tube sections 44a, 44b are arranged to surround the pipe body 40 and the first tube section 44a is secured to the end fitting 43 by a first locking arrangement and the second tube section 44b is secured to the collar 42a at the root end of the bend stiffener by a second locking arrangement. The collar 42a and a part of the helically shaped body 42b of the bend stiffener are extending partly into the second tube section 44b and are attached to the pipe 30 and/or to the rods 35.

In both FIG. 4 and FIG. 5 it can be seen that the pitch P# of the windings of the string of the helically shaped body increases with the distance to the root end of the bend stiffener.

One or both of the respective pairs of tube sections 34a, 34b, 44a, 44b may e.g. be secured to a surface installation or a subsea installation.

Figure 6:
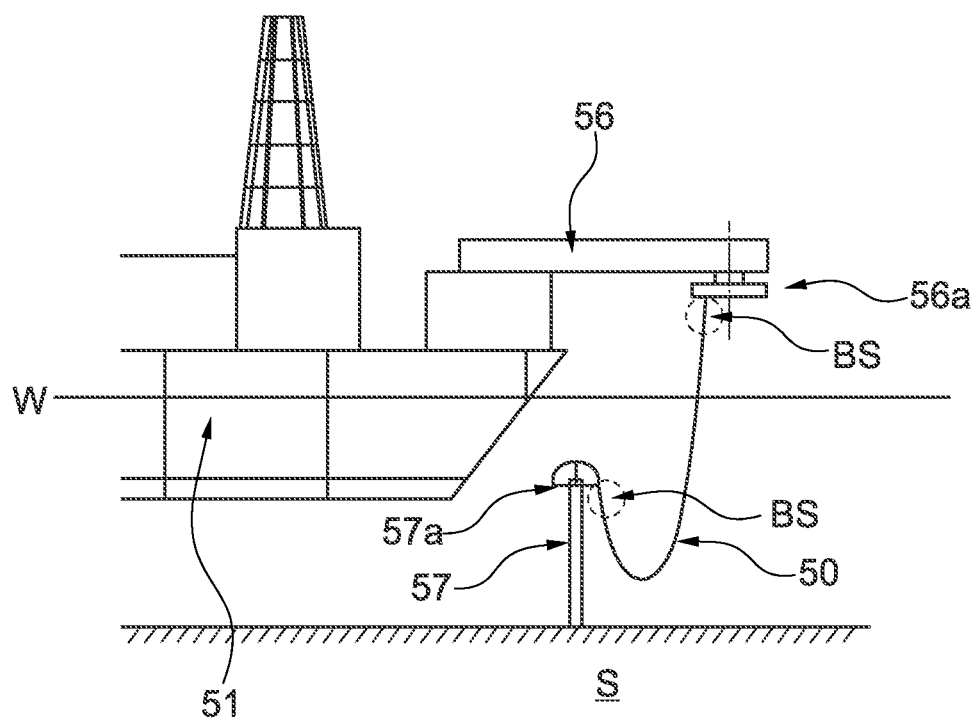
FIG. 6 is a schematic illustration of an offshore installation where preferred positions of bend stiffeners are indicated.

FIG. 6 shows an offshore installation comprising a surface installation comprising a vessel 51, such as a weather-vanning vessel which is moored to the seabed S. The vessel is at the water line W. The vessel comprises a hang off structure 56 with a turret 56a from which a riser pipe 50 is hanged out. The turret 56a may support several riser pipes. The riser pipe 50 hangs off from the turret 56a to a subsea structure 57, where it is connected at the top 57a of the subsea structure 57

The markings BS indicates preferred positions of a bend stiffener. Advantageously the shown installation is an offshore installation of an embodiment of the invention and the installation comprises at least one bend stiffener with a helically shaped body arranged to surround a stiffened length section of the flexible pipe 50 and where the root end of the bend stiffener is locked at an axial distance to the end fitting of the pipe where it is connected to the turret 56a or the top 57a of the subsea structure 57.

Figure 7:
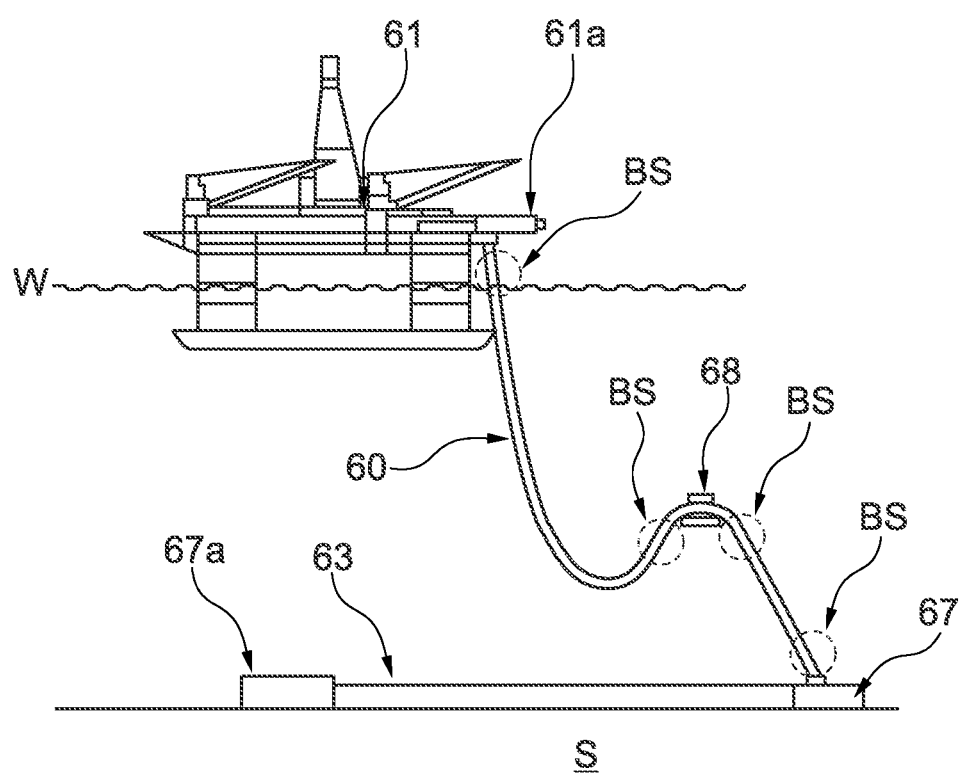
FIG. 7 is a schematic illustration of another offshore installation where preferred positions of bend stiffeners are indicated.

FIG. 7 shows an offshore installation comprising a surface installation at the water line W comprising a platform 61. The platform 61 has a hang off structure 61a from where the riser pipe 60 hanges out. The riser pipe 60 hangs off from the hang off structure 61a to a midwater arch 68 where the pipe 60 is secured. The pipe 60 further extends from the midwater arch 68 to a subsea installation 67. At the subsea installation 67 the riser pipe is connected to a flow line 63 leading further to a second subsea 67a installation e.g. a well.

The markings BS indicates preferred positions of a bend stiffener. Advantageously the shown installation is an offshore installation of an embodiment of the invention and the installation comprises at least one bend stiffener with a helically shaped body arranged to surround a stiffened length section of the flexible pipe 60 and where the root end of the bend stiffener is locked at an axial distance to the end fitting of the pipe where it is connected to the hang off structure 61a, the midwater arch 68 or the subsea installation 67.

Figure 8:
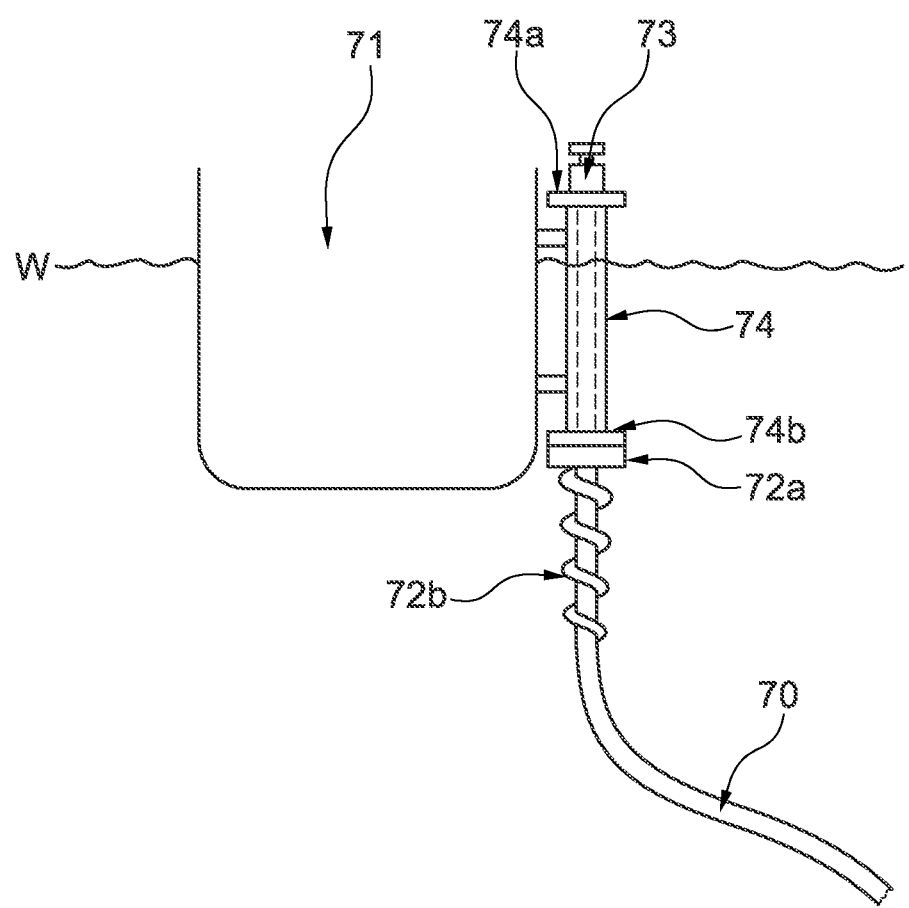
FIG. 8 is a schematic illustration of an embodiment of an offshore installation of the invention.

The offshore installation shown in FIG. 8 comprises a surface installation 71 at the water line W to which a support structure comprising an I-tube 74 is secured. The I-tube 74 comprises a first collar 74a with a first locking arrangement which holds the end fitting 73 of the riser pipe 70 and a second collar 74b with a second locking arrangement holding the root end 72a of the bend stiffener 72a, 72b.

The pipe body 70 is extending downwards towards a seabed installation. The bend stiffener comprises the helically shaped body 72a arranged to surround a stiffened length section of the flexible pipe body 70.

Figure 9:
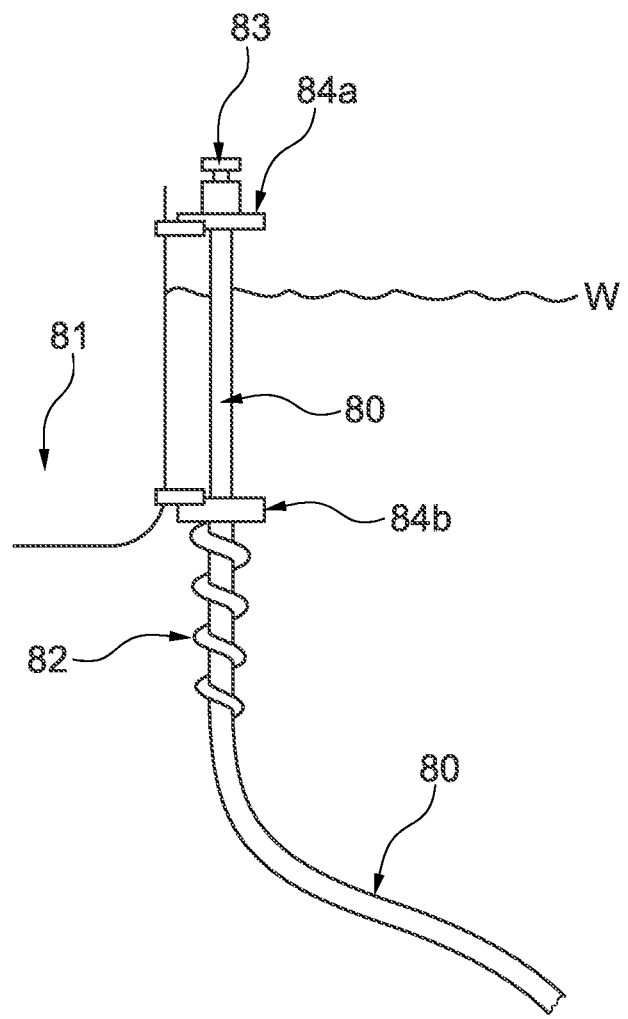
FIG. 9 is a schematic illustration of another embodiment of an offshore installation of the invention.

The offshore installation shown in FIG. 9 comprises a surface installation 81 at the water line W. The surface installation 81 comprises a support structure comprising a pair of tube sections 84a, 84b rigidly held in a fixed distance to each other such that they surround the pipe body 80 with a distance to each other along the length of the pipe axis. The riser pipe comprises the pipe body 80 and the end fitting 83. The bend stiffener 82 comprises a helically shaped body arranged to surround the pipe body 80 and a root end connected to the second tube section 84b. The first tube section 84a supports the end fitting 83.

Figure 10:
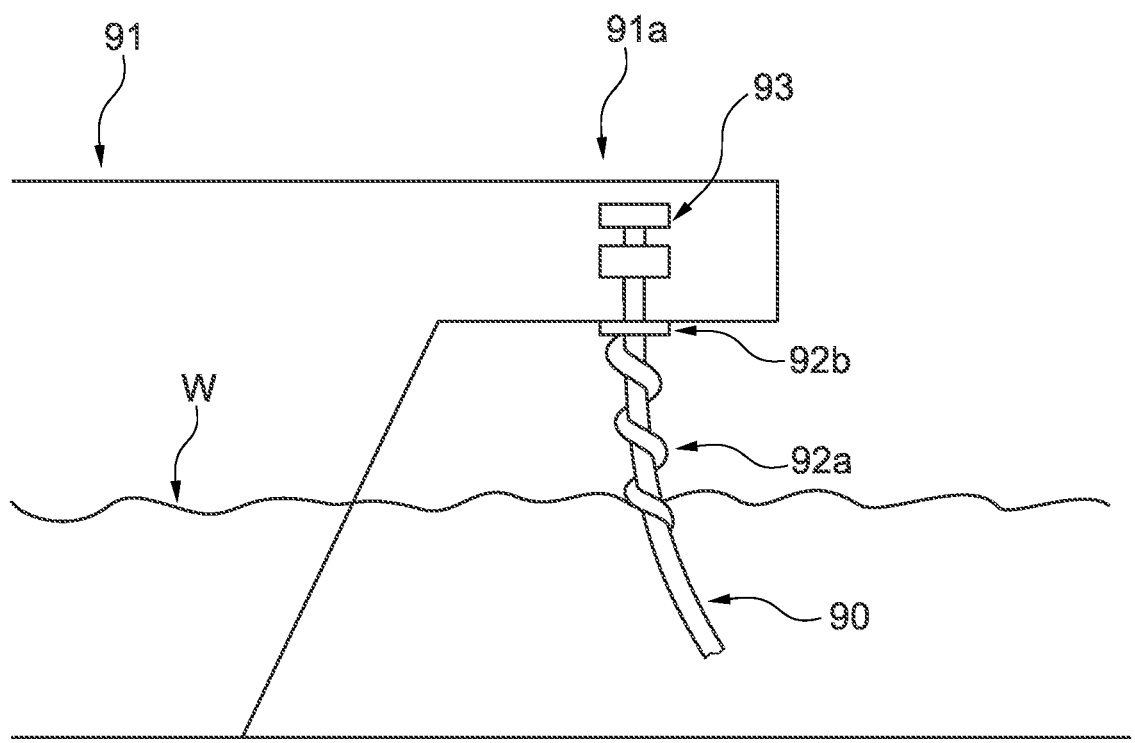
FIG. 10 is a schematic illustration of a further embodiment of an offshore installation of the invention.

FIG. 10 shows an offshore installation comprising a surface installation at the water line W comprising a vessel 91 with a hang off structure 91a from where the riser pipe 90 hangs out. The riser pipe has the pipe body 90 and an end fitting 93. The bend stiffener comprises a helically shaped body 92a and a collar 92b at its root end. The helically shaped body 92a surrounds a stiffened length section of the pipe body 90. The end fitting is secured at or to the hang off structure 91a.

Figure 11A:
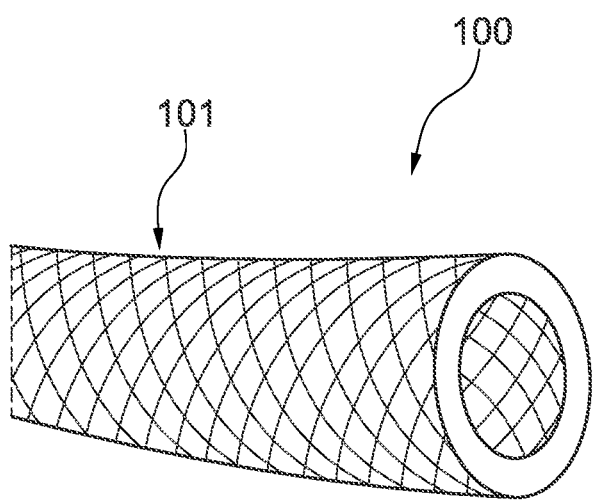
FIGS. 11a and 11b are perspective views of sections of respective strings forming helically shaped bodies of bend-stiffeners of installations of embodiments of the invention

FIG. 11a shows a section of a string of a helical string of a helically shaped body of a bend stiffener. The string is of solid polymer material 100 reinforced with cross wound metal wires 101 which are embedded in the polymer material. The string is hollow.

Figure 11B:
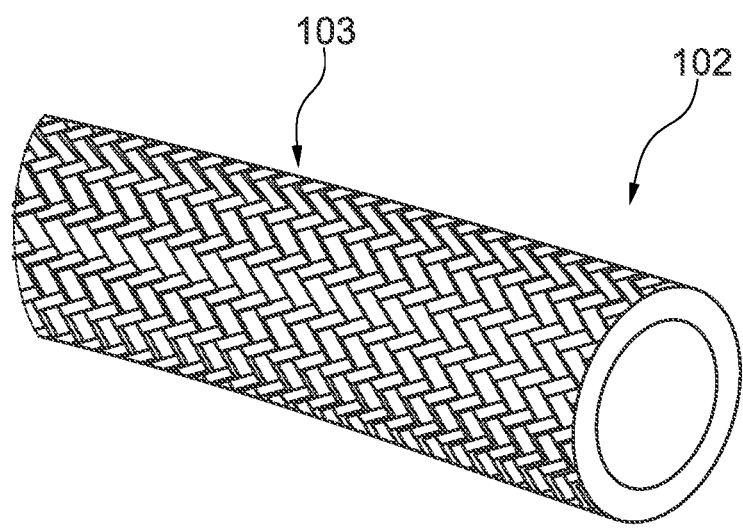

FIG. 11b shows a section of a string of another helical string 102 of a helically shaped body of a bend stiffener. The string is of braided tapes 103 of reinforced and cured polymer. The braded tapes are advantageously made from prepreg which after braiding and helical shaping of the string is fully cured.

Figure 12A:
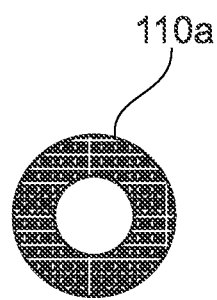
FIGS. 12a, 12b, 12c, 12d, 12e are cross-sectional views of respective strings forming helically shaped bodies of bend-stiffeners of installations of embodiments of the invention The pipe shown in FIG. 1 has a typical structure for a riser pipe. The pipe is shown without an end-fitting and where parts of the respective layers have been removed to expose the respective layers of the pipe. The riser pipe of FIG. 1 comprises from inside and out a carcass 1, a pressure sheath 2, a pressure armor layer 4, two cross wound tensile armor layers 4, 5, a holding layer 6 and an outer sheath 7.

FIG. 12a shows a string of a helical shaped body of a bend stiffener seen in a cross sectional cut. The string is substantially circular and has a hollow center part 110a. The string is made from a polymer matrix reinforced with cut fibers and cured after being shaped.

Figure 12B:
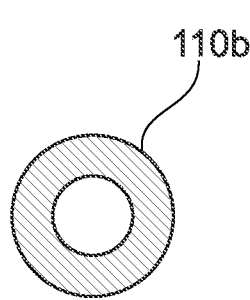

FIG. 12b shows another string of a helically shaped body of a bend stiffener seen in a cross sectional cut. The string is substantially circular and has a hollow center part 110b. The string is made from a polymer matrix reinforced with woven fibers and cured after being shaped.

Figure 12C:
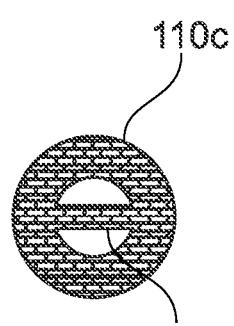

FIG. 12c shows a further string of a helically shaped body of a bend stiffener seen in a cross sectional cut. The string is substantially circular and has two hollow parts 110c separated with a cross-wall 111. The string is made from a polymer matrix reinforced with woven fibers and cured after being shaped.

Figure 12D:
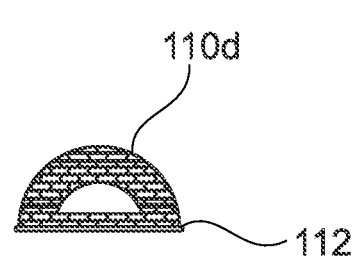

FIG. 12d shows a further string of a helically shaped body of a bend stiffener seen in a cross sectional cut. The string is substantially semicircular with a flat face arranged to face towards the pipe. The string has a semicircular hollow part 110d and is made from metal. The flat face comprises a layer 112 of a low friction material.

Figure 12E:
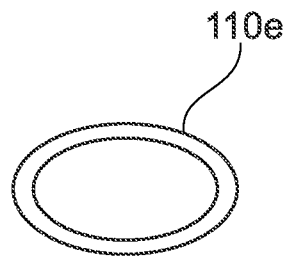

FIG. 12e shows a further string of a helically shaped body of a bend stiffener seen in a cross sectional cut. The string is oval and has a hollow center part 110e.

What is claimed is:

1. An offshore installation comprising a riser pipe and a bend stiffener, wherein the riser pipe comprises a flexible pipe body and an end fitting and a longitudinal pipe axis, said pipe body has a pipe length, said bend stiffener comprises a helically shaped body arranged to surround a stiffened length section of the flexible pipe body, the bend stiffener has a root end and a far end, wherein the root end is closer to the end fitting than the far end and the root end is locked at a distance to the end fitting, determined along the longitudinal pipe axis to provide a fixed distance along the length of the pipe axis between the end fitting and the root end of the bend stiffener.

2. The offshore installation of claim 1, wherein the pipe body comprises a composite of layered materials that forms a pressure-containing conduit.

3. The offshore installation of claim 1, wherein said stiffened length section of the flexible pipe body is in the vicinity of a subsea installation or in the vicinity of a surface installation to which the riser is connected.

4. The offshore installation of claim 1, wherein said root end of the bend stiffener is mechanically locked to said end fitting via a support structure defining the distance between the end fitting and the root end.

5. The offshore installation of claim 1, wherein the installation comprises a support structure, said root end of the bend stiffener is supported by and/or attached to said support structure.

6. The offshore installation of claim 5, wherein said support structure comprises a rigid structure arranged to lock said end fitting and said root end of the bend stiffener in a position relative to each other.

7. The offshore installation of claim 5, wherein said support structure comprises a tube, arranged to lock said end fitting and said root end of the bend stiffener.

8. The offshore installation of claim 1, wherein the bend stiffener is rotarily movable with respect to a support structure.

9. The offshore installation of claim 1, wherein the bend stiffener is angularly movable with respect to a support structure.

10. The offshore installation of claim 1, wherein the bend stiffener is stiffly attached to a support structure.

11. The offshore installation of claim 1, wherein the bend stiffener root end comprises a collar, said collar being attached to the pipe and/or a support structure for locking the bend stiffener root end at an axial distance to the end fitting.

12. The offshore installation of claim 1, wherein said stiffened length section of said flexible pipe body is surrounded by at least one helical winding.

13. The offshore installation of claim 1, wherein at least a length section L1 of the helically shaped body is arranged to rest against an outer sheath of the pipe, said length section L1 of the helically shaped body has an inner diameter corresponding to an outer diameter of the outer sheath.

14. The offshore installation of claim 1, wherein said bend stiffener helically shaped body has an inner diameter which is essentially constant along a length of the helically shaped body.

15. The offshore installation of claim 1, wherein said bend stiffener helically shaped body has an inner diameter, which varies along a length of the helically shaped body.

16. The offshore installation of claim 1, wherein said helically shaped body comprises a helical string of solid material wound to surround the pipe, said helically shaped body is helix shaped in at least a part of a length of the helically shaped body.

17. The offshore installation of claim 16, wherein said helical string comprises at least two full windings surrounding the pipe.

18. The offshore installation of claim 17, wherein said helical string windings have an angle to a bend stiffener axis of from about 30° to about 65°.

19. The offshore installation of claim 1, wherein said helically shaped body comprises two or more helical strings of solid material wound to surround the pipe, said two or more helical strings are wound in the same directions.

20. The offshore installation of claim 1, wherein said helically shaped body has a bend stiffness (flexural rigidity) which is larger than a bend stiffness of the pipe surrounded by said helically shaped body.

21. The offshore installation of claim 1, wherein a rigid rod is interposed between the root end and the end fitting along the longitudinal pipe axis, and wherein the fixed distance substantially corresponds to the length of the rigid rod.

22. An offshore installation comprising a riser pipe and a bend stiffener, wherein the riser pipe comprises a flexible pipe body and an end fitting and a longitudinal pipe axis, said pipe body has a pipe length, said bend stiffener comprises a helically shaped body arranged to surround a stiffened length section of the flexible pipe body, the bend stiffener has a root end and a far end, wherein the root end is closer to the end fitting than the far end and the root end is locked at an axial distance to the end fitting, determined along the longitudinal pipe axis and wherein the helically shaped body comprises a helical string of solid material wound to surround the pipe.

* * * * *